United States Patent
Vasudevan et al.

(10) Patent No.: US 7,414,983 B2
(45) Date of Patent: Aug. 19, 2008

(54) METHODS FOR MANAGING DATA TRANSMISSIONS BETWEEN A MOBILE STATION AND A SERVING STATION

(75) Inventors: Damondaran Vasudevan, Palatine, IL (US); Gary E. Western, Johnsburg, IL (US); Zhou Gao, Lake Zurich, IL (US); Patrick R. Marcell, St. Charles, IL (US)

(73) Assignee: Motorola, Inc., Schaumburg, IL (US)

( * ) Notice: Subject to any disclaimer, the term of this patent is extended or adjusted under 35 U.S.C. 154(b) by 567 days.

(21) Appl. No.: 11/027,357

(22) Filed: Dec. 30, 2004

(65) Prior Publication Data

US 2006/0146744 A1  Jul. 6, 2006

(51) Int. Cl.
*G01R 31/08* (2006.01)
(52) U.S. Cl. ...................... 370/252; 370/331
(58) Field of Classification Search ............... None
See application file for complete search history.

(56) References Cited

U.S. PATENT DOCUMENTS

| | | | |
|---|---|---|---|
| 4,910,464 A * | 3/1990 | Trett et al. ............... 327/517 |
| 5,442,637 A * | 8/1995 | Nguyen .................... 370/452 |
| 6,275,471 B1 | 8/2001 | Bushmitch et al. |
| 6,458,034 B1 * | 10/2002 | Aiki et al. ................. 463/49 |
| 7,238,159 B2 * | 7/2007 | Banet et al. ............... 600/485 |
| 2001/0012279 A1 | 8/2001 | Haumont et al. |
| 2002/0186675 A1 | 12/2002 | Otting et al. |
| 2005/0141477 A1 * | 6/2005 | Tomita et al. ............. 370/349 |
| 2005/0259663 A1 * | 11/2005 | Ode et al. ................ 370/395.4 |

FOREIGN PATENT DOCUMENTS

WO  WO 02/100012 A1  12/2002
WO  WO 03/026299 A1 *  3/2003

* cited by examiner

*Primary Examiner*—Firmin Backer
*Assistant Examiner*—Phuongchau B Nguyen

(57) ABSTRACT

In the present technique of a data transmission management, responsive to a reselection during a data transmission, a determination (314, 514) is made as to whether remaining untransmitted data blocks of the data transmission can be sent within an allowed transmission time. If so, the remaining untransmitted data blocks are transmitted (318, 518) to complete the data transmission. If, however, the remaining untransmitted data blocks cannot be transmitted within the allowed transmission time, the communication link is terminated (312, 510) to stop the downlink data transmission with a serving station.

15 Claims, 9 Drawing Sheets

METHODS FOR MANAGING DATA TRANSMISSIONS BETWEEN A MOBILE STATION AND A SERVING STATION

TECHNICAL FIELD

This invention relates generally to a data transmission management process between a mobile station and a serving station.

BACKGROUND

In the current Universal Mobile Telecommunication System ("UMTS"), R4 compliant mobile stations are supported by a Network Assistant Cell Change procedure. Specifically, for networks that support a Cell Change Notification ("CCN") mode, upon a mobile station detecting the need to change cells due to deteriorated radio frequency ("RF") conditions, the network is notified of the proposed cell change with a Packet Cell Change Notification ("PCCN") message from the mobile station. If the network knows the target cell data, the network responds accordingly by sending one or more Packet Neighbor Cell Data ("PNCD") messages back to the mobile station. Two general scenarios happen at this point. In one scenario where the network determines that the cell chosen by the mobile station is an optimal cell, the network sends a Packet Cell Change Continue ("PCCC") message to the mobile station. If, on the other hand, in the second scenario where the network determines that the cell chosen by the mobile station is not an optimal cell, a Packet Cell Change Order ("PCCO") message is sent to the mobile station. This whole procedure of sending the PCCC or the PCCO message to the mobile station is guarded by a timer of 960 milliseconds. In other words, the network is given 960 milliseconds to respond with the PCCC or PCCO message to the mobile station, counting from the time when the network receives the PCCN message from the mobile station.

The problem is that if the mobile station sends out the PCCN message while the Count Down ("CV") is starting to decrement, meaning that very little data are left to complete the data transmission between the mobile station and the serving station, the mobile station will, nevertheless, terminate the ongoing Temporary Block Flow ("TBF") as soon as it receives the PCCC or PCCO message from the network. This is true even when the data transfer could have been finished in less than 960 milliseconds. Similarly, in the downlink example, the mobile station could receive the PCCC or PCCO message when the remaining data could have been transferred within the allowed time. So, instead of finishing the data transfer with the current serving cell, the mobile station starts the data transfer all over again by establishing a new TBF at the target cell to finish transferring the remaining data. Starting a new TBF is very inefficient, however, because it requires a significant amount of time, especially when the data transfer could have been finished in less than 960 milliseconds. Another problem is that if the data transfer involves the Transmission Control Protocol ("TCP") layer that requires an acknowledgement ("ACK") packet, this ACK packet can be further delayed, because the mobile station is forced to leave the current cell and establish a new TBF in the target cell to finish the data transfer. This again is very efficient. Thus, for all these reasons, the overall data transfer rate of the mobile station is reduced, resulting in deterioration of mobile station overall performance.

BRIEF DESCRIPTION OF THE DRAWINGS

The above needs are at least partially met through provision of the data transmission management described in the following detailed description, particularly when studied in conjunction with the drawings, wherein.

Figure 1:
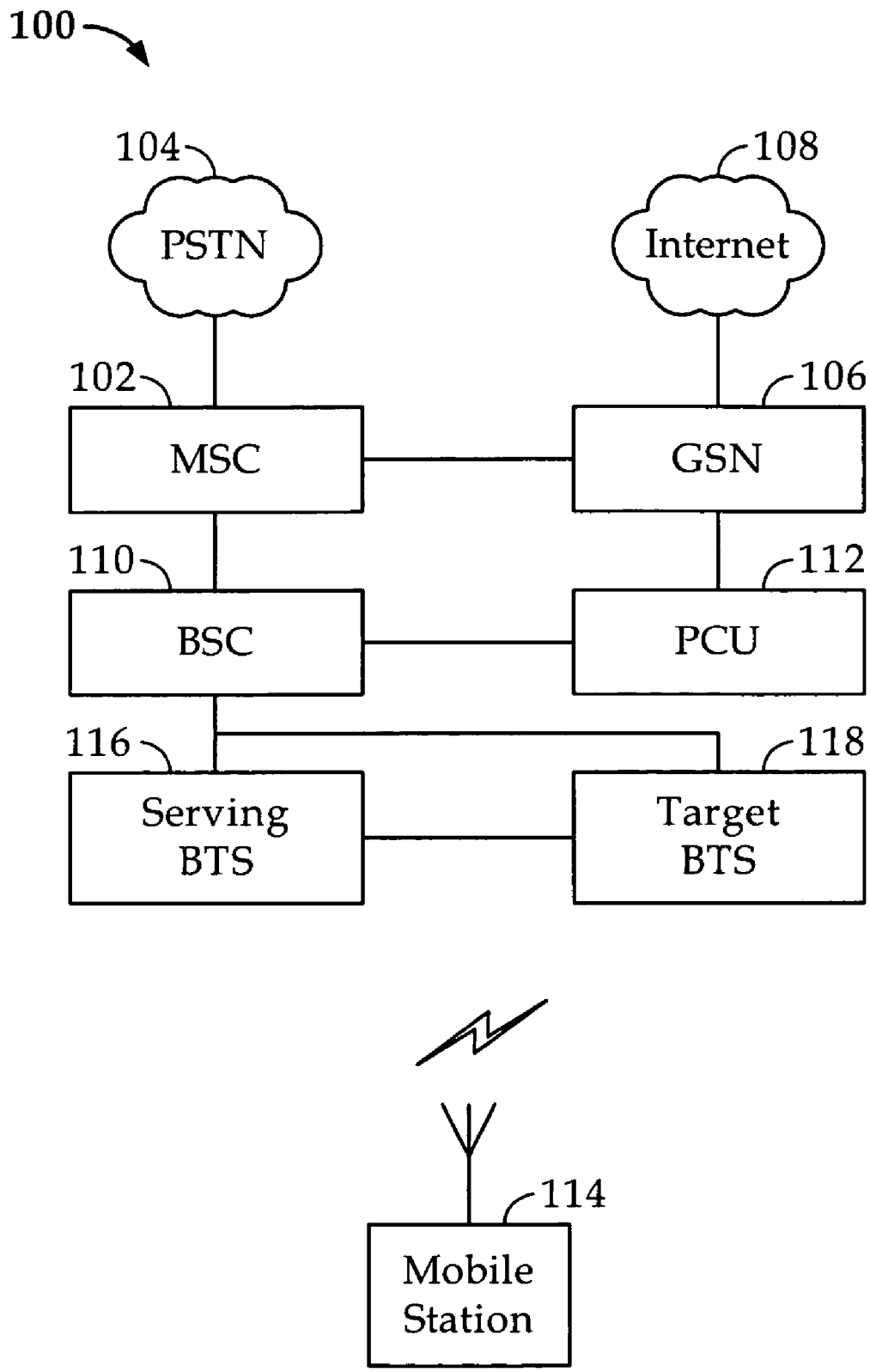
FIG. 1 comprises a block diagram of a typical wireless communication system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, responsive to a reselection during a downlink data transmission, a determination is made as to whether remaining untransmitted data blocks of the downlink data transmission can be sent within an allowed transmission time. If so, the remaining untransmitted data blocks are transmitted to complete the downlink data transmission. If, however, the remaining untransmitted data blocks cannot be transmitted within the allowed transmission time, the communication link is terminated to stop the downlink data transmission with a serving station. In one embodiment, the reselection relates to a soft handover between the serving station and a target serving station. In another embodiment, a request is sent to drop the mobile station from the serving station responsive to the termination of the communication link. In various teachings, prior to the determination as to whether the remaining untransmitted data blocks can be sent within the allowed transmission time, it is determined whether a selected channel coding scheme is currently available. If not, the communication link is terminated to stop the downlink data transmission with the serving station, which is followed by a request to drop the mobile station from the serving station being sent. If, on the other hand, the channel coding scheme is currently available, the remaining untransmitted data blocks are formatted to the selected channel coding scheme.

According to various teachings, data transmission management is further provided that, responsive to a reselection during a downlink data transmission, assesses the shortest transmission time needed to complete the downlink data transmission based on one or more current conditions. It is next determined whether the assessed shortest transmission time is greater than an allowed transmission time. If not, remaining untransmitted data blocks are sent to complete the downlink data transmission, and otherwise, the communication link is terminated to stop the downlink data transmission with the serving station. In one embodiment, the termination of the communication link also triggers a request to be sent that drops the mobile station from the serving station. In various embodiments, prior to the assessment of the shortest transmission time needed to complete the downlink data transmission, one or more currently available channel coding schemes are detected, and an available bandwidth for the downlink data transmission with the serving station is also assessed. According to a particular embodiment, the assessed shortest transmission time is based on one or more currently available channel coding schemes and/or the assessed bandwidth available for the downlink data transmission. In one embodiment, the remaining untransmitted data blocks are formatted according to the predefined current condition, which includes the available bandwidth and/or the available channel coding scheme.

According to various embodiments, an uplink data transmission management has also been provided that, responsive to a reselection during the uplink data transmission, makes a determination as to whether the uplink data transmission is in countdown, and if so, the shortest receive time needed to complete the uplink data transmission is assessed. Otherwise, the communication link is again terminated to stop the uplink data transmission with the serving station. In one embodiment, the assessment of the shortest receive time further includes a determination as to whether the assessed shortest receive time is greater than an allowed transmission time, and if not, the remaining data blocks are received from the mobile station to complete the uplink data transmission. Otherwise, the communication link is terminated to stop the uplink data transmission with the serving station, which triggers a request to be sent to drop the mobile station from the mobile station according to one embodiment. In one embodiment, the reselection is a soft handover between the serving station and a target station. In another embodiment, the predefined throughput condition is based on a receiving radio frequency signal level or quality, a mobile sharing level, and an available coding scheme.

Through the teachings of various embodiments, an improved data transmission management technique has been provided that allows for more efficient data transfer during a mobile station reselection between a serving station and a target station. Because data transmissions that can be completed within the allowed transmission time are not unnecessarily terminated, unnecessary retransmission due to a reselection has been substantially eliminated. As a result, higher overall throughput of the system is provided. Moreover, the radio frequency conditions are changed dynamically to accommodate the cell change procedures, which further allows for a more efficient air time usage. Since the time needed to complete the data transmission is being assessed according to current conditions and/or historical data of the mobile station, a more accurate transfer time is provided to make an intelligent decision to either terminate or to complete the data transmission with the serving station. The various teachings also provide seamless integration into the existing systems because no standard changes are required with their implementation. Thus, a data transmission management has been provided that optimizes the overall throughput by improving, among other things, the procedure of data transmission responsive to a reselection.

Referring now to the drawings, and in particular to FIG. 1, for purposes of providing an illustrative but non-exhaustive example to facilitate this description, a specific operational paradigm using a Universal Mobile Telecommunication system ("UMTS") is shown and indicated generally at 100. Those skilled in the art, however, will recognize and appreciate that the specifics of this illustrative example are not specifics of the invention itself and that the teachings set forth herein are applicable in a variety of alternative settings. For example, since the teachings described are not platform dependent, they can be applied to various systems, such as a General Packet Radio Service ("GPRS"), a Code Division Multiple Access ("CDMA") system, and/or a Time Division Multiple Access ("TDMA") system. In fact, any cellular networks are contemplated and are within the scope of the invention.

Pursuant to this example, a typical UMTS deployment is shown that includes a mobile switching center ("MSC") 102 that is connected to a public switched telephone network ("PSTN") 104 and a GPRS Service Node ("GSN") 106 that is connected to the Internet 108. The MSC 102 and the GSN 106 are respectively connected to a Base Station Controller ("BSC") 110 and a Packet Control Unit ("PCU") 112, which are, in turn, connected to each other. The MSC 102 and the GSN 106 are also connected to enable a mobile station ("MS") 114 to connect to the Internet 108. In particular, the MS 114 communicates with the Base Transceiver System ("BTSs") 116, 118. The BTSs 116, 118, in turn, communicate with the BSC 110 that exchanges communications with either the MSC 102 or the PCU 112, depending on the type of information being transferred. Specifically, the MS 114 is communicating with the serving BTS 116, and a detection for reselection to the target BTS 118 is shown. Since the MSC 102 and the GSN 106 are connected with the two networks of the PSTN 104 or the Internet 108, the MS 114 has access to the cellular network through the BSC 110, the PSTN 104 through the MSC 102, and the Internet 108 through the GSN 106, via the BTSs 116, 118. The UMTS communication system 100 shown is a typical exemplary structure of a cellular communication network that is suitable for various embodiments described.

Figure 2:
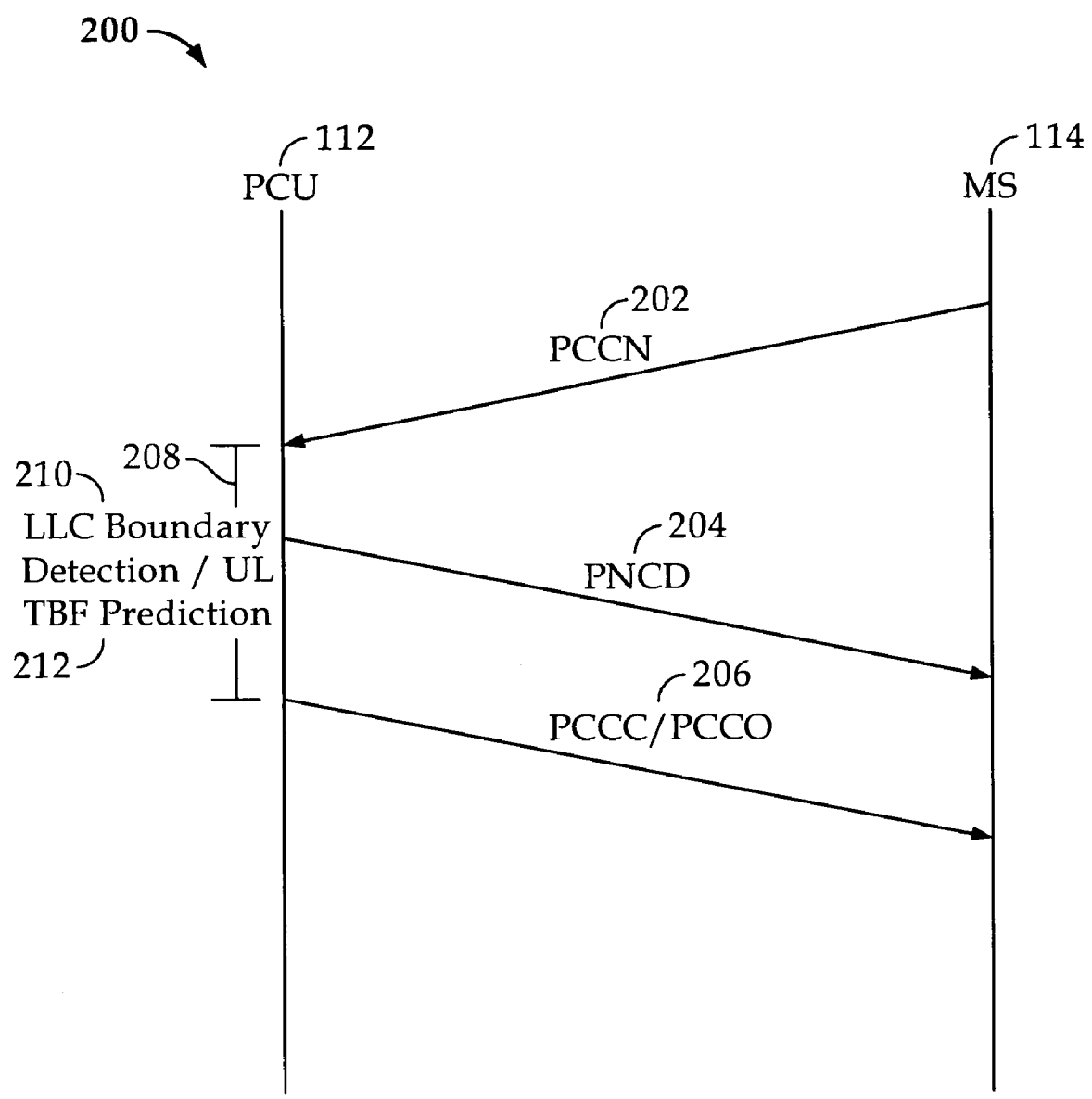
FIG. 2 comprises a call flow diagram of a cell change process suitable for various embodiments of the invention.

Referring to FIG. 2, a call flow diagram of a cell change process between the PCU 112 and the MS 114 that is suitable for various embodiments is shown and indicated generally at 200. The call flow diagram illustrates the relationship between the MS 114 and the PCU 112. Although in practice the MS 114 is not technically in direct communication with the PCU 112, it is commonly known in the art that the communication between them occurs through the use of the BTSs 116, 118 and BSC 110. For simplicity, however, the BTSs 116, 118 and BSC 110 are excluded from the call flow diagram 200 to avoid confusion. Moreover, since the call flow diagram 200 is a specific implementation in the UTMS, the messages sent between the PCU 112 and the MS may be different in other system implementations. The specifics of these other implementations are readily appreciated by one skilled in the art, and thus they are within the scope of the various teachings provided, even if they may not be shown.

As typically done in the UTMS, the MS 114 sends 202 a Packet Cell Change Notification ("PCCN") message to the PCU 112 responsive to a MS detection of a need to change from the serving BTS 116 to a target BTS 118. If the target BTS 118 is known, one or more Packet Neighbor Cell Data ("PNCD") messages are sent 204 back to the MS 114 from the PCU 112. After which, depending whether the target BTS 118 is or is not an optimal cell for the MS 112, either a Packet Cell Change Continue ("PCCC") that instructs the MS 114 to continue and connect to the target BTS 118 or a Packet Cell Change Order ("PCCO") message that instructs the MS to not connect to the target BTS is respectively sent 206 to the MS 112. In the UMTS, the time from when the PCU 112 received the PCCN message to the time when the PCU 112 actually sends the PCCC/PCCO is a block of time 208 where the various embodiments determine whether a data transfer can be executed within this given block of time.

In particular, according to one downlink embodiment, a logical link control ("LLC") boundary is detected 210 according to this block of time to determine whether the data transmission should be continued or terminated at the downlink of the PCU 112. An uplink embodiment, in contrast, makes an assessment 212 of a prediction of the uplink temporary block flow ("TBF") based on this block of time 208 to determine whether to continue or terminate the receipt of data from the MS. Since this call flow diagram 200 is a specific implementation with the UMTS, 960 milliseconds is the maximum allowed time for this block of time 208 according to the T3208 standard of the Network Assistant Cell Change procedure in the UMTS. Of course, the downlink detection and uplink prediction based on this time requirement of 960 milliseconds is one of the multiple embodiments contemplated. In fact, it should be noted that the various teachings described are not limited to the use of a time block. Rather, depending upon the system, one or more different parameters or different values of the parameter may also be chosen. As such, these other alternative embodiments are within the scope of the various teachings provided.

Figure 3:
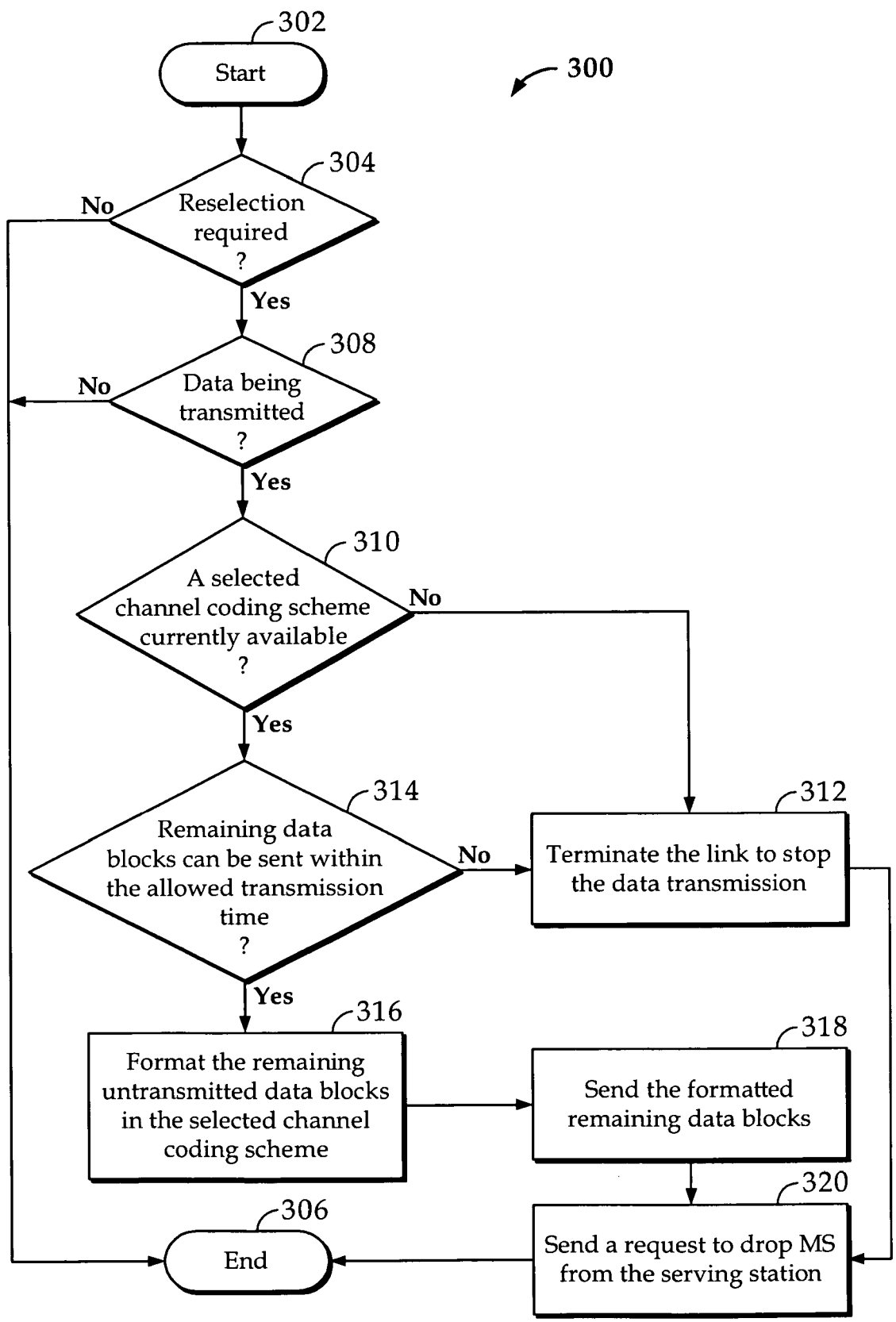
FIG. 3 comprises a flow chart call diagram of a downlink data transmission process using current conditions of the mobile station according to an embodiment of the invention.

Turning now to FIG. 3, a flow chart call diagram of a downlink data transmission process using current conditions of the mobile station according to an embodiment is shown and indicated generally at 300. It should be noted that although the processes described may be implemented at the PCU 112, the various teachings contemplate other implementations of different components in the system, such as the BSC 110 or the BTS 116. In fact, any component in the system can be used to fully or partially implement the various teachings described. As a result, as one skilled in the art can readily appreciate, any of the processes shown can be altered in multiple ways to achieve the same functions and/or results of the various teachings described. These processes shown are to be taken as one exemplary embodiment of multiple-variation embodiments that may not be specifically shown, and the other embodiments are within the scope of the various teachings described.

this process 300, it preferably starts with a determination 304 as to whether a reselection is required at the MS 114, and the reselection refers to a soft handover between the serving BTS 116 and the target BTS 118 in one embodiment. If not, the process ends 306 until a reselection is required. Upon a reselection requirement being detected 304, the process 300 next determines 308 whether data are actually being transmitted to the MS 114 during the reselection. If not, the process again ends 306. If, however, data are being transmitted to the MS 114 during the reselection detection, the process, in response, determines 310 whether a selected channel coding scheme is currently available to complete the transmission of remaining untransmitted data to the MS. If not, the process terminates 312 the communication link between the serving BTS 116 and the MS 114 in order to stop the data transmission to the MS. This is so because without the selected channel coding scheme being available, the data transmission would be inefficient with the serving BTS 116. As a result, in this embodiment shown, the communication link will be terminated 312. The MS 114 will accordingly connect to the target BTS 118, which will start the transmission of the remaining data using the target BTS that effectively becomes the current serving BTS.

If, however, the selected coding scheme is currently available, the process determines 314 whether the remaining untransmitted data blocks can be sent within an allowed transmission time. In this particular embodiment, this determination of whether to complete the data transmission with the MS 114 is made based on the current condition of the channel conditions and/or throughput of the MS. The current conditions, as shown, include currently available code resources (e.g., the determination 310 as to whether a selected channel coding scheme is currently available) and the currently available throughput (e.g., the determination 314 as to whether the remaining untransmitted data blocks can be sent within the allowed time). Other current conditions, which are readily appreciated by a skilled artisan, can also be used, and the use of these different current conditions is dependent upon the standards of the system being implemented. Thus, other implementations of current conditions needed are within the scope of the various teachings described.

In the case when the remaining untransmitted data blocks cannot be sent within the allowed transmission, the communication link is again terminated 312 because there is no point to continue the data transmission since it cannot be completed with the current serving BTS 116. If, in contrast, the remaining untransmitted data block can in fact be transmitted within the allowed transmission time, the remaining untransmitted data blocks are then formatted 316 in the selected channel coding scheme and sent 318 to the MS 114. The process accordingly sends 320 a request to drop the MS from the serving BTS 116, which brings the process to the end 306.

Figure 4:
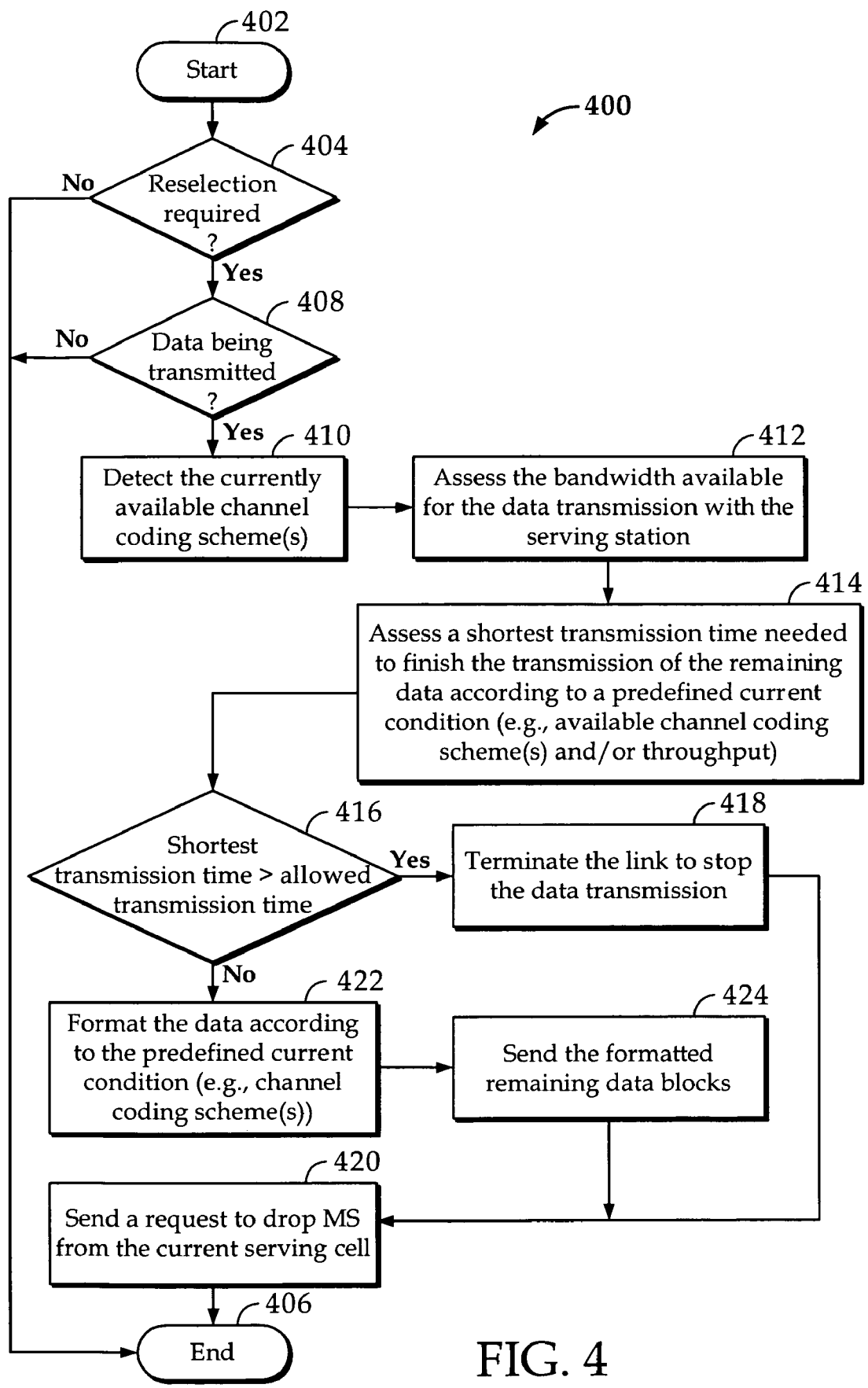
FIG. 4 comprises a flow chart diagram of a downlink data transmission process using historical data of the mobile station according to an embodiment of the invention.

Referring now to FIG. 4, a flow chart diagram of a downlink data transmission process using historical data of the mobile station is shown and indicated generally at 400. In this embodiment, the historical data of the mobile station is tracked in order to make a prediction as to whether the remaining untransmitted data can in fact be transmitted within the allowed time. In this embodiment, a plot of the MS's throughput is maintained over time, and using this information, the PCU can predict, at the current throughput rate, whether the current LLC frame can be sent to the MS within the allowed time. This process 400 shown similarly starts 402 with a determination 404 as to whether a reselection is required at the MS, and if not, the process accordingly ends 406. Otherwise, another determination 408 is made as to whether data are being transmitted, and again if not, the process simply ends 406. If, however, the MS is experiencing a reselection during a data transmission, one or more currently available channel coding schemes are detected 410, followed by an assessment of 412 of the bandwidth that is currently available for data transmission using the current serving BTS 116.

A shortest transmission time needed to complete the transmission of the remaining untransmitted data blocks is assessed 414 according to one or more predefined conditions. In this embodiment, the predefined conditions are based on the detected currently available channel coding scheme(s) available, the bandwidth available, and the historical data of the throughput of the MS. From this assessed shortest transmission time, it is determined 416 whether the shortest transmission time is greater than the allowed transmission time. If so, there is little point to continue the transmission since it cannot be completed with the current serving BTS 116, and the communication link between the serving BTS and the MS 114 is terminated 418, followed by a request to drop the MS 114 from the serving BTS 116 to be sent 420, which ends 406 the process.

On the other hand, if the shortest transmission time is not greater than the allowed transmission time, the remaining untransmitted data blocks will be formatted 422 according to the predefined conditions. In particular, in this embodiment, since there may be multiple coding schemes available at any given time, at least one or a combination of coding schemes are chosen to complete the data transmission, specifically a combination that provides for the shortest transmission time. The formatted data blocks are then accordingly sent 424 to complete the data transmission between the MS 114 and the serving BTS 116, and after which, the request to drop the MS is similarly sent 420, and the process ends 406 at this point.

Figure 5:
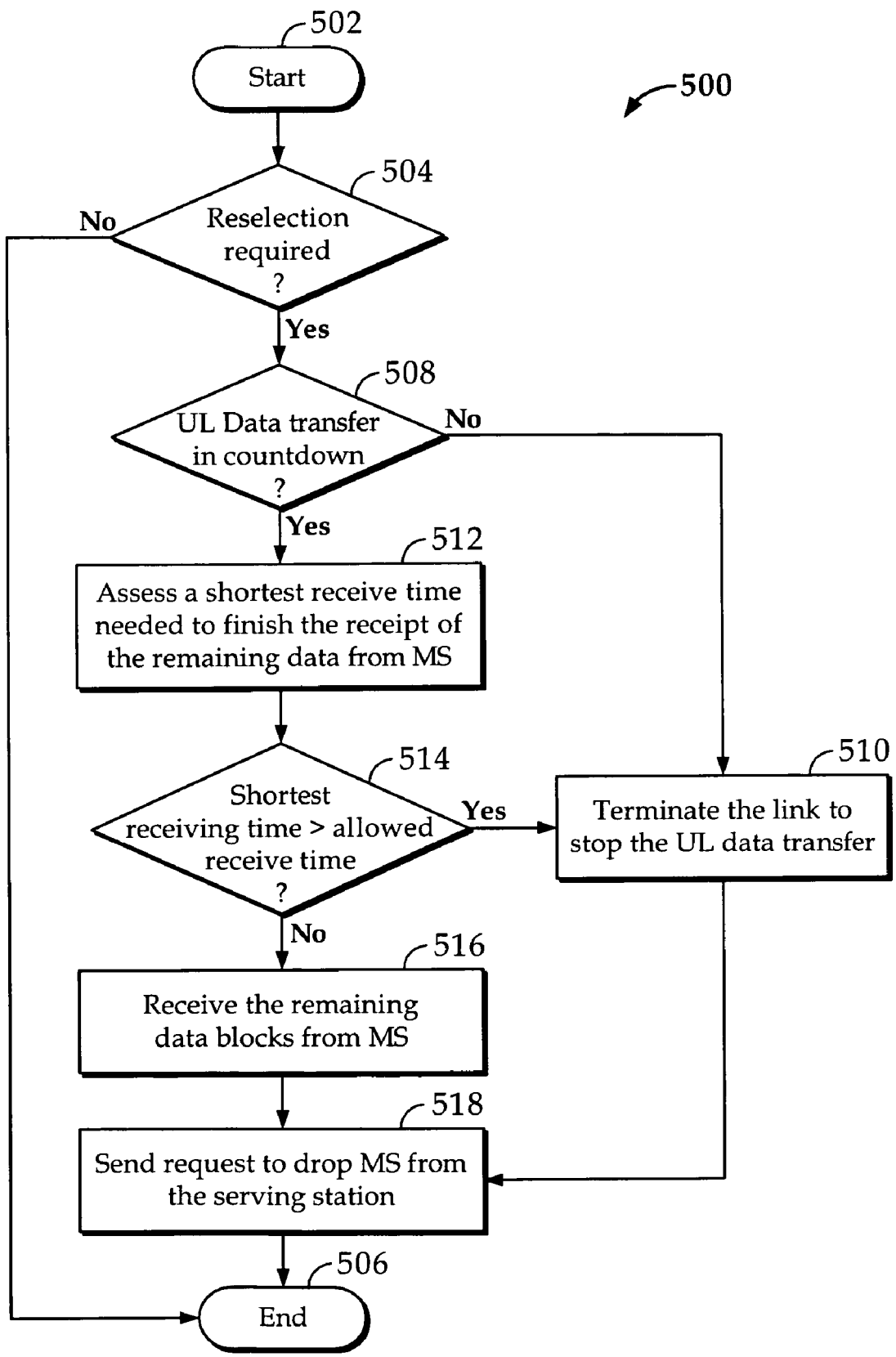
FIG. 5 comprises a flow chart diagram of an uplink data transmission process according to an embodiment of the invention.

Referring to FIG. 5, a flow chart diagram of an uplink data transmission process according to an embodiment is shown and indicated generally at 500. The process also starts 502 with a determination 504 as to whether a reselection is required on the MS, and if not, the process ends 506. Otherwise, if so, another determination 508 is made as to whether an uplink data transfer is currently in countdown. Since the countdown is the standard for tracking an end of uplink data transfer in UTMS, it is used in this embodiment. Other standards, however, may be used, depending upon the system implementation. Those other standards are, nevertheless, within the scope of the various embodiments described.

In the case where the uplink data transfer is not in countdown, meaning the uplink data transfer is not nearing the end, the communication link between the serving BTS 116 and the MS 114 is again terminated 510 because the serving BTS cannot receive the remaining untransmitted data from the mobile station within the allowed time. If, however, the uplink data transfer is in fact in countdown, a shortest receive time needed to finish the receipt of the remaining untransmitted data from the MS 114 is assessed 512. This assessed shortest receive time is then compared to determine 514 whether it is greater than the allowed receive time, and if so, the communication link is once again terminated 510. Otherwise, since the serving BTS can finish the uplink data transfer within the allowed transmission time, the remaining data blocks are received 516 from the MS 114 before a request is sent 518 to drop the MS from the serving BTS 116. After the drop message is sent 518, the process concludes 506 at this point.

Figure 6:
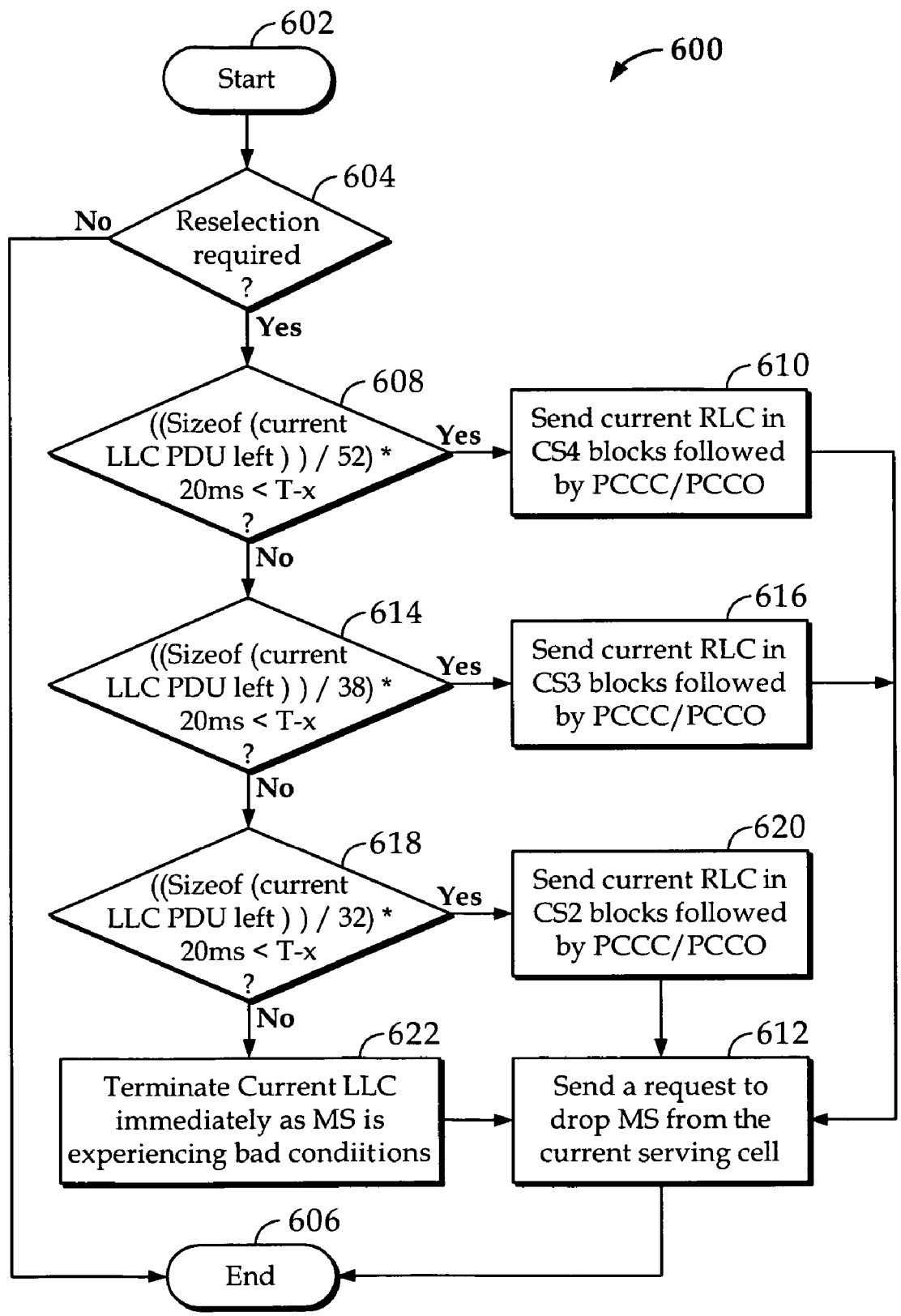
FIG. 6 comprises a flow chart diagram of a downlink data transmission process implemented on a Universal Mobile Telecommunication System using current conditions of the mobile station according to an embodiment of the invention.

Turning now to FIG. 6, a flow chart diagram of a downlink data transmission process implemented on a UMTS using current conditions of the MS 114 is shown and indicated generally at 600. Since the various embodiments relate to a data transmission during a reselection, the process starts 602 with a determination 604 as to whether a reselection is required at the MS 114, and if not, the process ends 606. Otherwise, in this particular embodiment shown, a determination 608 is made based on the formula $$\frac{Sizeof(\text{current\_LLC\_PDU\_left})}{52} * 20 \ ms < T - x \qquad (1)$$

where "Sizeof(current_LLC_PDU_left)" refers to the size of the size of the remaining untransmitted data, the constant "52" is based on the coding scheme 4 ("CS4") standard of the UMTS, "20 ms" refers to a predefined time block for the execution of the process, "T" refers to the allowed transmission time, and "x" refers to the time adjustment to allow receipt of the acknowledgement packet for the LLC frame. If the determination 608 is true, meaning the remaining untrans- mitted data in CS4 blocks can be transmitted within the allowed time, the current Radio Link Control ("RLC") is sent 610 in CS4 blocks to the MS 114 followed by the PCCC or the PCCO message being sent as a response to the reselection requirement of the MS. Put differently, the remaining untransmitted data blocks on the RLC are sent in CS4 blocks to the MS, after which the PCCC or the PCCO message is sent to the MS. The process further sends 612 a request to drop the MS 114 from the serving BTS, which brings the process to the end 606.

If, however, the determination 608 is false, another determination 614 is made based on the formula $$\frac{Sizeof(\text{current\_LLC\_PDU\_left})}{38} * 20 \ ms < T - x \qquad (2)$$

where "Sizeof(current_LLC_PDU_left)" refers to the size of the remaining untransmitted data, the constant "38" is based on the coding scheme 3 ("CS3") standard of the UMTS, "20 ms" refers to a predefined time block for the execution of the process, "T" refers to the allowed transmission time, and "x" refers to the time adjustment to allow receipt of the acknowledgement packet for the LLC frame. If the determination 614 is true, meaning the remaining untransmitted data in CS3 blocks can be transmitted within the allowed time, the current RLC is sent 616 in CS3 blocks to the MS 114 followed by the sending of the PCCC or the PCCO. The process continues to send 612 a request to drop the MS 114 from the serving BTS 116, and the process ends 606.

If, on the other hand, the determination 614 is also false, another determination 618 is made based on the formula $$\frac{Sizeof(\text{current\_LLC\_PDU\_left})}{32} * 20 \ ms < T - x \qquad (3)$$

where "Sizeof(current_LLC_PDU_left)" refers to the size of the remaining untransmitted data, the constant "32" is based on the coding scheme 2 ("CS2") standard of the UMTS, "20 ms" refers to a predefined time block for the execution of the process, "T" refers to the allowed transmission time, and "x" refers to the time adjustment to allow receipt of the acknowledgement packet for the LLC frame. If the determination 618 is true, meaning the remaining untransmitted data in CS2 blocks can be transmitted within the allowed time, the current RLC is sent 616 in CS2 blocks to the MS 114 followed by the sending of the PCCC or the PCCO. The process again sends 612 the request to drop the MS 114 from the serving BTS 116, and the process ends 606.

If the determination 618 is false, in this case all the available coding schemes have been checked for the data transmission and no coding scheme resource is suitable. The communication link, specifically the LLC, between the MS 114 and the serving BTS 116 will be terminated 622 because the MS is experiencing bad conditions with the serving BTS. The request to drop the MS from the serving BTS is again sent 612 after the LLC has been terminated, which brings the process to the end 606.

Figure 7:
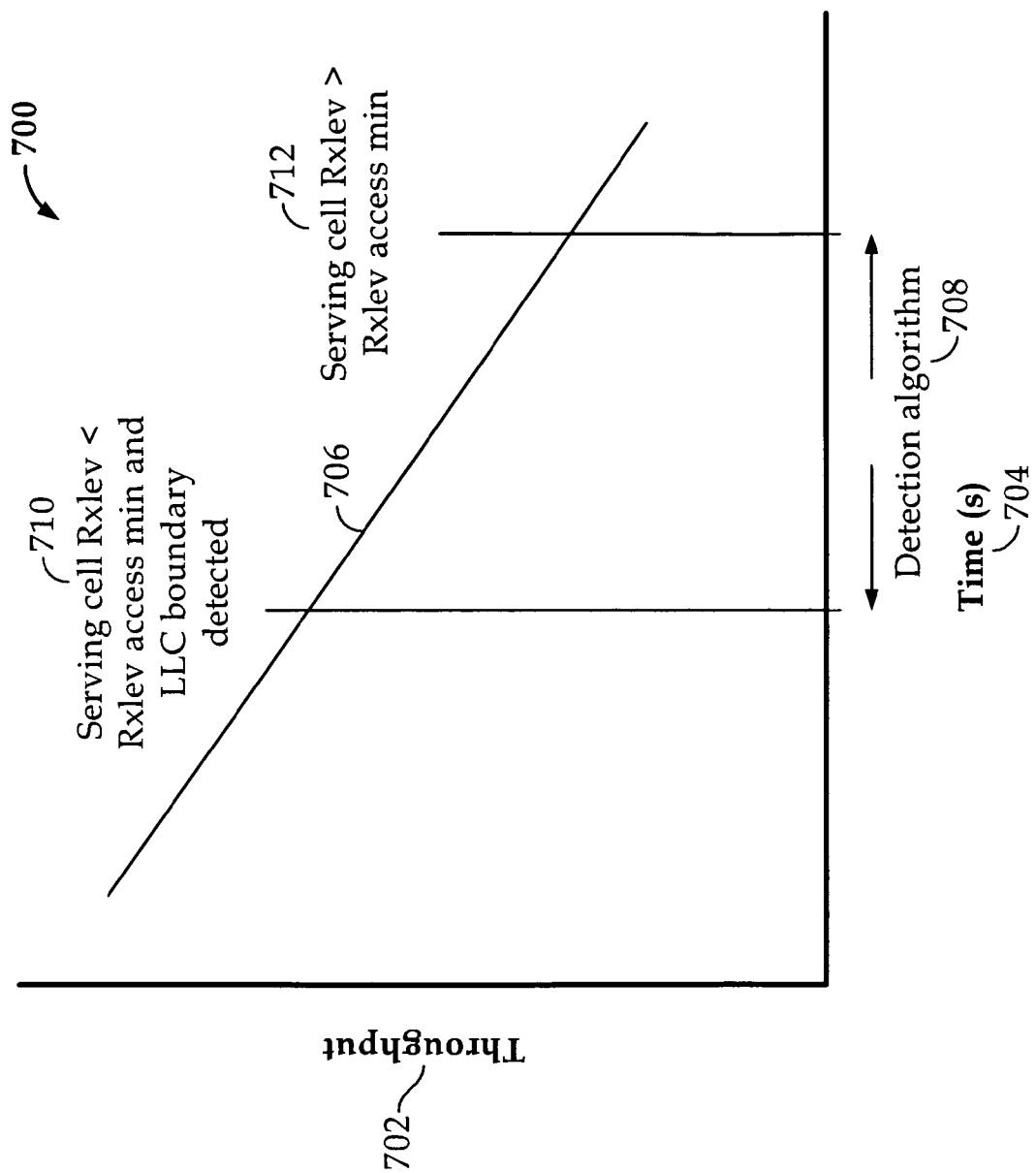
FIG. 7 comprises a plot diagram depicting an example of the historical data of the mobile station used according to an embodiment of the invention.

Referring now to FIG. 7, an exemplary plot of the historical data of the mobile station used according to an embodiment is shown and indicated generally at 700. For embodiments of the downlink detection of the LLC boundary, the historical data plot is maintained that tracks the throughput of the MS over a period of time. Using this information along with the minimum received power level required by the mobile station to access the cell ("rxlev access min") of the serving BTS 116, the PCU could predict whether the remaining untransmitted data can be sent within the allowed transmission time. As shown, specifically, the throughput 702 of the MS 114 is plotted over a period of time 704 to generate a slope 706 as an example. The detection process 708 of the downlink LLC using the historical data plot may be implemented at a starting point 710 when detected that a serving cell received power level ("rxlev") is less than the rxlev access min and an ending point 712, and when detected that the serving cell rxlev is greater than the rxlev access min. From this historical data plot 700, the detection process is dynamically triggered, and one embodiment of a detection process is shown in FIG. 8.

Figure 8:
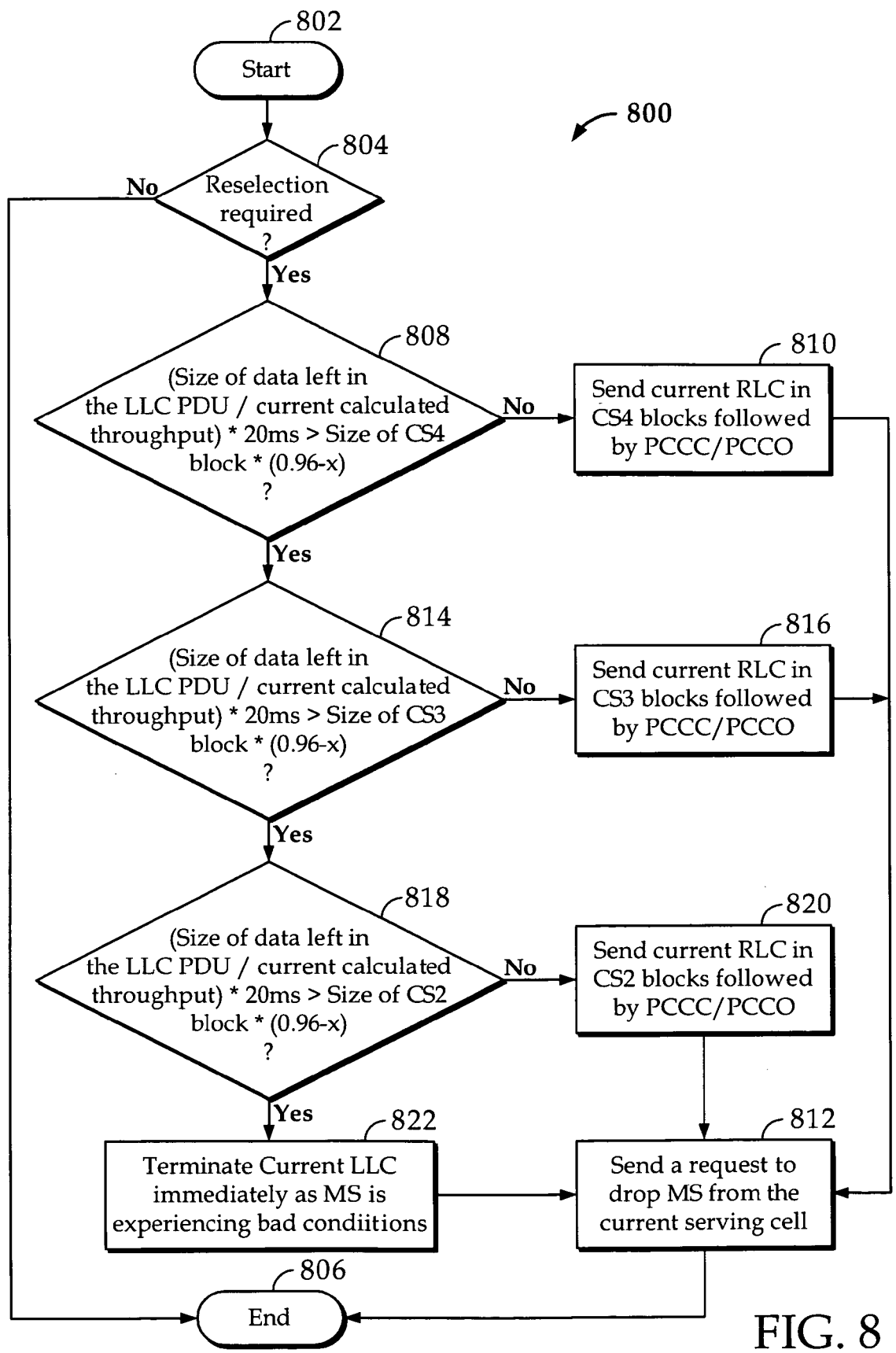
FIG. 8 comprises a flow chart diagram of a downlink data transmission process implemented on a Universal Mobile Telecommunication System using historical data of the mobile station according to an embodiment of the invention.

FIG. 8 shows a flow chart diagram 800 of the downlink data transmission process implemented on a UMTS using historical data of the MS, such as the one shown in FIG. 7. This process 800 starts 802 with a determination 804 as to whether a reselection is required, and if not, the process ends 806. Otherwise, in this embodiment, a determination 808 is made based on the formula $$\frac{Sizeof(\text{current\_LLC\_PDU\_left})}{\text{current\_calculated\_throughput}} * 20 \ ms > \quad (4)$$

$$(\text{Size\_of\_CS4\_block}) * (0.96 - x)$$

where "Sizeof(current_LLC_PDU_left)" refers to the size of the remaining untransmitted data, "current_calculated_throughput" refers to the current throughput of the communication link between MS 114 and the serving BTS 116, "20 ms" refers to a predefined time block for the execution of the process, "size_of_CS4_block" refers to the size of the remaining untransmitted data in Code Scheme 4 ("CS4") blocks, "0.96" refers to the allowed transmission time, and "x" refers to the time adjustment to allow receipt of the acknowledgement packet for the LLC frame. If the determination 808 is false, meaning the remaining untransmitted data in CS4 blocks can be transmitted within the allowed time, the current RLC is sent 810 in CS4 blocks to the MS 114 followed by the sending of the PCCC or the PCCO. The process continues to send 812 a request to drop the MS 114 from the serving BTS 116, and the process ends 806.

If, however, determination 808 is true, meaning the remaining untransmitted data cannot be sent in CS4 within the allowed time, a next determination 814 is made for Code Scheme 3 ("CS3") based on the formula $$\frac{Sizeof(\text{current\_LLC\_PDU\_left})}{\text{current\_calculated\_throughput}} * 20 \ ms > \quad (5)$$

$$(\text{Size\_of\_CS3\_block}) * (0.96 - x)$$

where "Sizeof(current_LLC_PDU_left)" refers to the size of the remaining untransmitted data, "current_calculated_throughput" refers to the current throughput of the communication link between the MS 114 and the serving BTS 116, "20 ms" refers to a predefined time block for the execution of the process, "size_of_CS3_block" refers to the size of the remaining untransmitted data in CS3 blocks, "0.96" refers to the allowed transmission time, and "x" refers to the time adjustment to allow receipt of the acknowledgement packet for the LLC frame. If the determination 814 is false, meaning the remaining untransmitted data in CS3 blocks can be transmitted within the allowed time, the current RLC is accordingly sent 816 in CS3 blocks to the MS 114 followed by the sending of the PCCC or the PCCO message. The process continues to send 812 the request to drop the MS 114 from the serving BTS 116, and the process ends 806.

If the determination 814 is true, a next determination 818 is made based on the formula $$\frac{Sizeof(\text{current\_LLC\_PDU\_left})}{\text{current\_calculated\_throughput}} * 20 \ ms > \quad (6)$$

$$(\text{Size\_of\_CS2\_block}) * (0.96 - x)$$

where "Sizeof(current_LLC_PDU_left)" refers to the size of the remaining untransmitted data, "current_calculated_throughput" refers to the current throughput of the communication link between MS 114 and the serving BTS 116, "20 ms" refers to a predefined time block for the execution of the process, "size_of_CS2_block" refers to the size of the remaining untransmitted data in Code Scheme 2 ("CS2") blocks, "0.96" refers to the allowed transmission time, and "x" refers to the time adjustment to allow receipt of the acknowledgement packet for the LLC frame. If the determination 818 is false, meaning the remaining untransmitted data in CS2 blocks can be transmitted within the allowed time, the current RLC is sent 820 in CS2 blocks to the MS 114 followed by the sending of the PCCC or the PCCO. The process continues to send 812 a request to drop the MS 114 from the serving BTS 116, and the process ends 806.

If, however, the determination 818 is true, in this case all the available coding schemes have been checked for the data transmission and no coding scheme resource is suitable. The communication link, specifically the LLC, between the MS 114 and the serving BTS 116 will be terminated 822 because the MS is experiencing bad conditions with the serving BTS. The request to drop the MS 114 from the serving BTS 116 is again sent 812 after the LLC has been terminated, which brings the process to the end 806.

Figure 9:
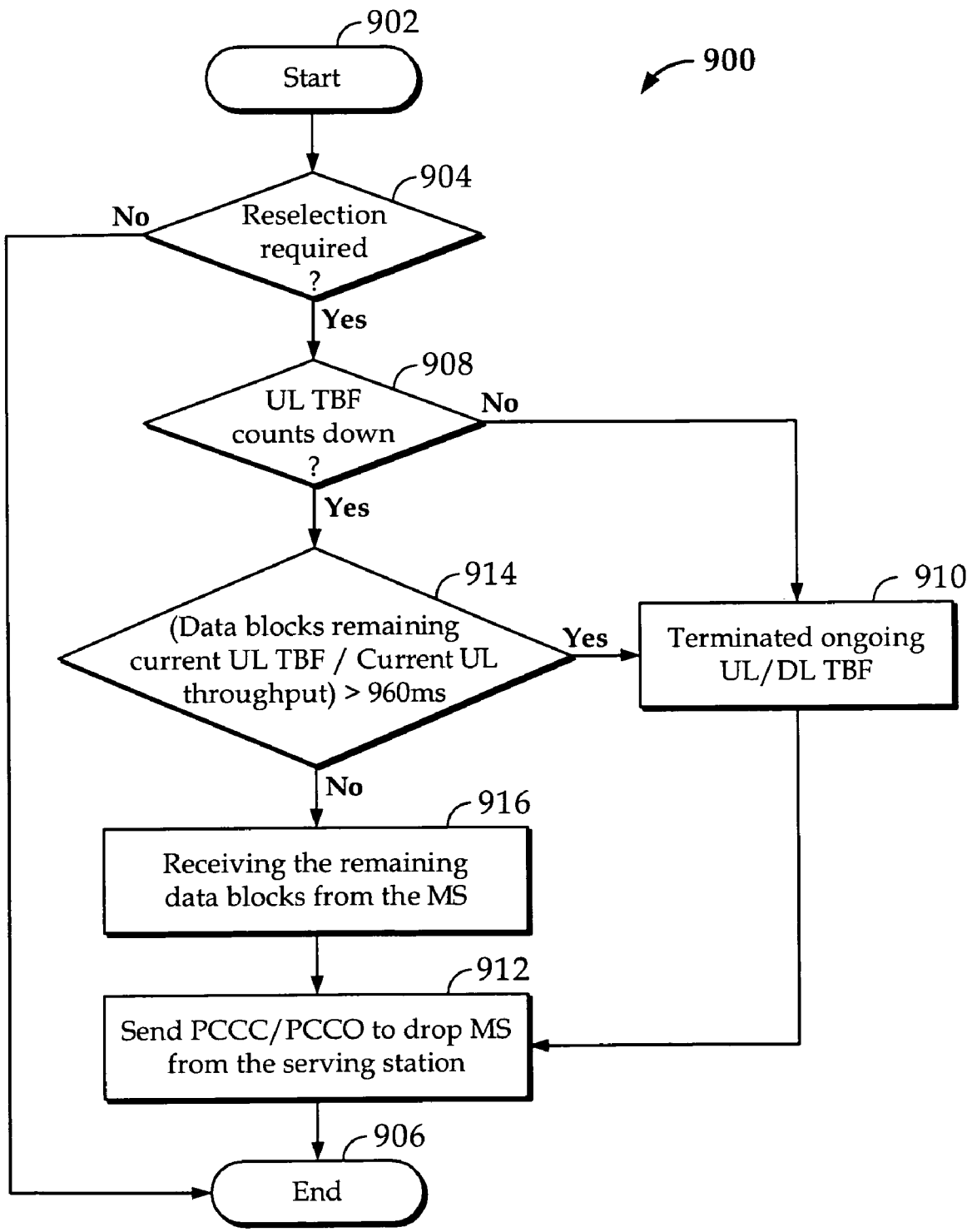
FIG. 9 comprises a flow chart diagram of an uplink data transmission process implemented on a Universal Mobile Telecommunication System according to an embodiment of the invention.

Referring to FIG. 9, a flow chart diagram of an uplink data transmission process implemented on a UMTS according to an embodiment is shown and indicated generally at 900. This process relates to the uplink of the PCU 112 where a prediction is made to determine whether the remaining untransmitted data can be received from the MS 114 within the allowed transmission time. In this process, it is similarly initiated 902 with a reselection requirement determination 904, and if reselection is not required, the process ends 906. On the other hand, if reselection is required, it is determined 908 whether the uplink temporary block flow ("TBF") is currently in a counting down state. If not, meaning the data transfer from the MS 116 is not near the end, the ongoing uplink and downlink TBF are then terminated 910, which triggers a PCCC or a PCCO message 912 to drop the MS from the serving BTS 116. If, however, the uplink TBF is counting down, a determination 914 is made based on the formula $$\frac{\text{Data\_blocks\_remaining\_current\_UL\_TBF}}{\text{Current\_UL\_Throughput}} < 960 \ ms \quad (7)$$

where "data_blocks_remaining_current_UL_TBF" refers to the remaining untransmitted data, "current_UL_throughput" refers to the current throughput of the uplink channel, and "960 ms" refers to the allowed transmission time standard of the UMTS. If the determination 914 is false, meaning the remaining untransmitted data can be received from the MS 114 within the allowed transmission time of 960 milliseconds, the process continues to receive 916 the remaining untransmitted data blocks from the MS 116. After the data transfer from the MS 114 is completed, the process sends 912 the PCCC or PCCO message to drop the MS from the serving BTS 116, which brings the process to the end 906. On the other hand, if the determination 914 is true, meaning that the remaining transmitted data cannot be received within the allowed transmission time, the ongoing uplink and downlink TBF would then be terminated 910, followed by the PCCC or PCCO message being sent 912, which concludes 906 the process at this point.

With these various teachings shown, a novel data transmission management technique has been provided that more efficiently completes or terminates existing data transfer during a MS reselection. In particular, since existing data transmissions are not unnecessarily terminated when they can be in fact efficiently completed before the reselection, unnecessary retransmissions due to reselection have been substantially reduced and/or eliminated. As such, the result is higher overall throughput. Furthermore, because the radio frequency conditions are being changed dynamically to accommodate the cell change procedures, a more efficient air time usage is provided. With the assessment of an estimated time needed to finish the data transfer that is based on current conditions and/or historical data of the MS, more accurate transfer time assessment is provided in order to make an intelligent decision as to whether to terminate or complete the transmission. As a result, a data transmission management has been provided that optimizes the overall throughput by various improvements of the cell change procedures.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method of managing a downlink data transmission between a mobile station and a serving station via a communication link comprising:
    determining whether remaining untransmitted data blocks of the downlink data transmission can be sent within an allowed transmission time responsive to a reselection during the downlink data transmission, wherein the reselection is a soft handover between the serving station and a target station; delaying the reselection when transmitting the remaining untransmitted data blocks can be sent within the allowed transmission time;
    sending the remaining untransmitted data blocks to complete the downlink data transmission when the remaining untransmitted data blocks of the downlink data transmission can be sent within the allowed transmission time and initiating the reselection when the remaining untransmitted data blocks are transmitted to complete the downlink data transmission;
    terminating the communication link to stop the downlink data transmission with the serving station when the remaining untransmitted data blocks of the downlink data transmission cannot be sent within the allowed transmission time and initiating the reselection.

2. The method according to claim 1 further comprising:
    sending a request to drop the mobile station from the serving station responsive to terminating the communication link to stop the downlink data transmission with the current serving station.

3. The method according to claim 1, wherein prior to determining whether remaining untransmitted data blocks of the downlink data transmission can be sent within the allowed transmission time further comprises:
    determining whether a selected channel coding scheme is currently available;
    terminating the communication link to stop the downlink data transmission with the serving station when the selected channel coding scheme is not currently available.

4. The method according to claim 3 further comprising:
    sending a request to drop the mobile station from the serving station responsive to terminating the communication link to stop the downlink data transmission with the current serving station.

5. The method according to claim 3, wherein prior to sending the remaining untransmitted data blocks to complete the downlink data transmission further comprises:
    formatting the remaining untransmitted data blocks in the selected channel coding scheme when the selected coding scheme is currently available.

6. A method of managing a downlink data transmission between a mobile station and a serving station via a communication link comprising:
    assessing a shortest transmission time needed to complete the downlink data transmission according to at least one predefined current condition responsive to a reselection during the downlink data transmission, wherein the reselection is a soft handover between the serving station and a target station;
    determining whether assessed shortest transmission time is greater than an allowed transmission time;
    delaying the reselection when assessed shortest transmission time is not greater than the allowed transmission time;
    sending remaining untransmitted data blocks to complete the downlink data transmission when the assessed shortest transmission time is not greater than the allowed transmission time and initiating reselection when the remaining untransmitted data blocks are transmitted to complete the downlink data transmission;
    terminating the communication link to stop the downlink data transmission with the serving station when the assessed shortest transmission time is greater than the allowed transmission time and initiating the reselection.

7. The method according to claim 6 further comprising:
    sending a request to drop the mobile station from the serving station responsive to terminating the communication link to stop the downlink data transmission with the serving station.

8. The method according to claim 6, wherein prior to assessing the shortest transmission time needed to complete the downlink data transmission further comprises:
    detecting at least one currently available channel coding scheme;
    assessing bandwidth available for the downlink data transmission with the current serving station.

9. The method according to claim 8, wherein assessed shortest transmission time needed to complete the downlink data transmission comprises any one or more selected from a group of the detected at least one currently available channel coding scheme and the assessed bandwidth available for the downlink data transmission.

10. The method according to claim 8, wherein sending the remaining untransmitted data blocks to complete the downlink data transmission further comprises:

formatting the remaining untransmitted data blocks according to the at least one currently available channel coding scheme.

11. The method according to claim 6, wherein sending the remaining untransmitted data blocks to complete the downlink data transmission further comprises:

formatting the remaining untransmitted data blocks according to the predefined current condition.

12. The method according to claim 6, wherein the predefined current condition comprises any one or more selected from a group of available bandwidth, at least one available channel coding scheme, and current radio conditions for the mobile station.

13. A method of managing an uplink data transmission between a mobile station and a serving station via a communication link comprising:

determining whether the uplink data transmission is in countdown responsive to a reselection during the uplink data transmission, wherein the reselection is a soft handover between the serving station and a target station;

assessing a shortest receive time needed to complete the uplink data transmission according to at least one predefined throughput condition when the uplink data transmission is in countdown;

terminating the communication link to stop the uplink data transmission with the serving station when the uplink data transmission is not in countdown:

determining whether assessed shortest receive time is greater than an allowed transmission time;

terminating the communication link to stop the uplink data transmission with the serving station when the assessed shortest receiving time is greater than the allowed transmission time;

delaying the reselection when the shortest receive time is not greater than the allowed transmission time;

receiving the remaining data blocks from the mobile station to complete the uplink data transmission when the assessed shortest receive time is not greater than the allowed transmission time.

14. The method according to claim 13 further comprising:

sending a request to drop the mobile station from the serving station responsive to terminating the communication link to stop the uplink data transmission with the serving station.

15. The method according to claim 13, wherein the predefined throughput condition comprises any one or more selected from a group of a receiving radio frequency signal level, a receiving radio frequency signal quality, a mobile sharing level, and an available coding scheme.

* * * * *